United States Patent Office 3,227,851
Patented Jan. 4, 1966

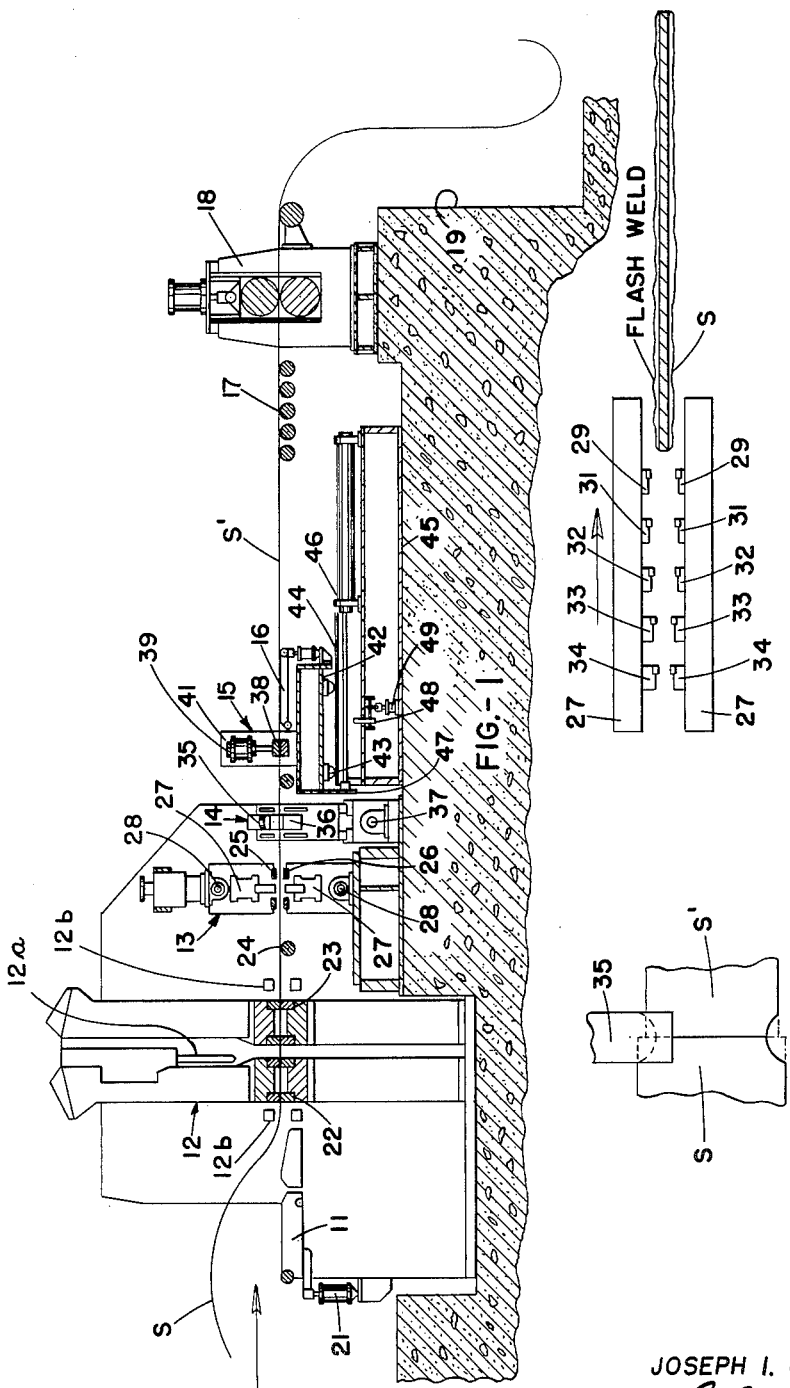

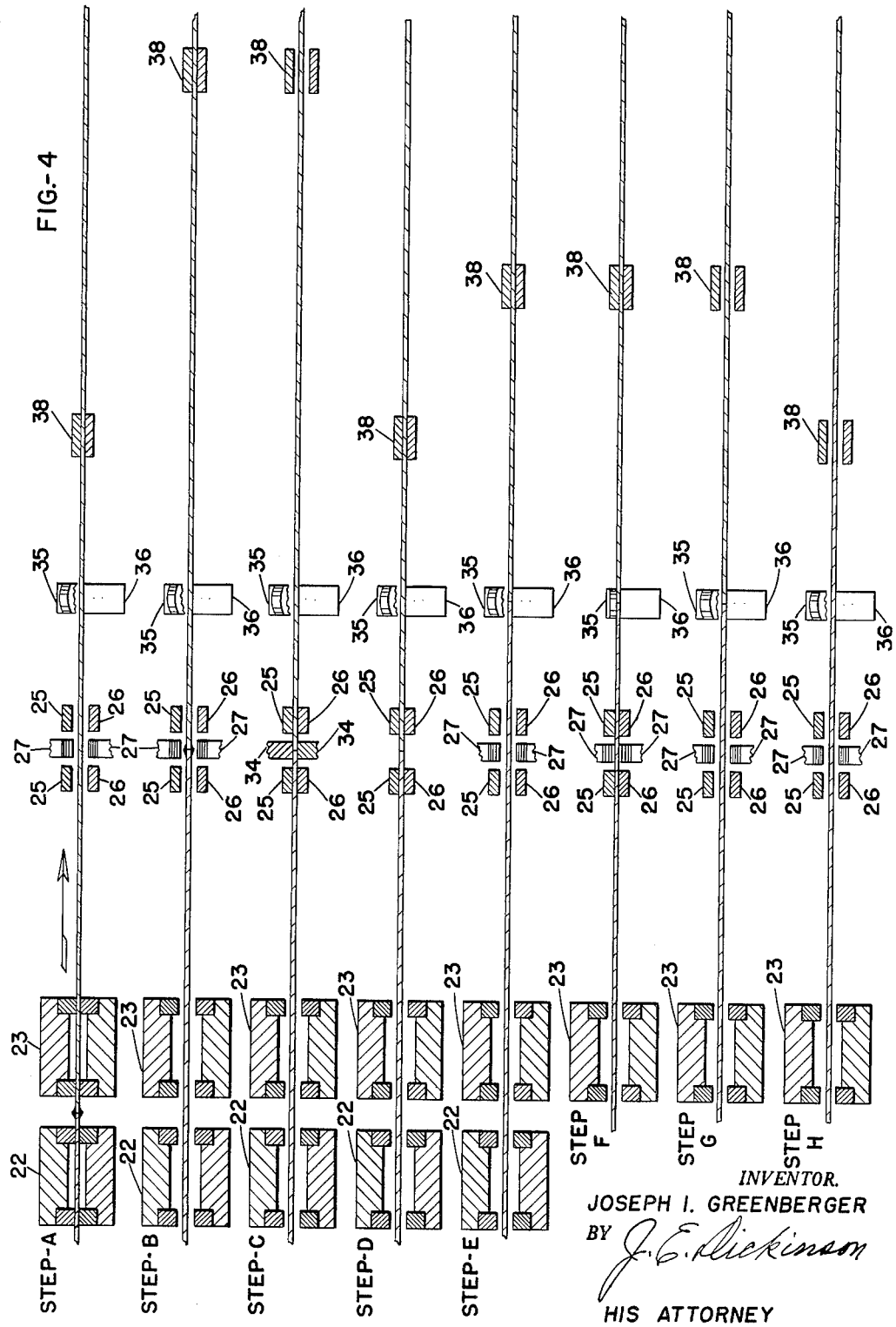

3,227,851
METHOD OF AND APPARATUS FOR TRIMMING FLASH WELDED STRIP
Joseph I. Greenberger, Pittsburgh, Pa., assignor to United Engineering and Foundry Company, Pittsburgh, Pa., a corporation of Pennsylvania
Filed Apr. 1, 1959, Ser. No. 803,419
15 Claims. (Cl. 219—97)

This invention relates in general to the joining together in end to end relationship by a flash welding operation elongated metallic strips and, in particular, to a method of and apparatus for removing the flash or burr formed at the line of weld as well as for removing the corners of the abutting welded strip ends particularly in those instances in which the strips welded together are of different widths or have been displaced laterally relative to each other so that one or both corners of one strip overhang the edges of the other strip.

Heretofore, separate means operative to remove the flash or burr from a flash weld and for cutting out the corners of the abutting strips at the ends of the weld have been employed independent of and without bearing any particular relationship either to the welder or to each other. Consequently, where such operations are performed, it will be appreciated that considerable time will be expended in moving and adjusting either the strip or the flash removal device as well as the strip corner shearing device in order to properly align the weld with those devices prior to the operation thereof.

One of the objects of this invention, therefore, is to provide both method and apparatus for welding together lengths of metal strip to form an endless strip, trimming the flash or burr from the line of weld and cutting out the corners of the strips on the line of weld in an efficient and expeditious manner.

Another object of this invention is to provide for a uniform step-by-step controlled movement of endless metal strip formed by the joining together the trailing end of one strip to the leading end of a succeeding strip by a flash welding operation thereby to position the weld so formed both for the removal of the flash therefrom as well as for cutting out the corners of the abutting strips adjacent to the ends of the line of weld.

Still another object of this invention is to provide suitable means for engaging and positioning strip in one controlled step thereby to position the line of weld of strip joined together by a flash welding operation adjacent to flash trimming means for the removal therefrom of the flash in an expeditious manner.

A further object of this invention is to provide means for intermittently gripping and moving flash welded strip to position the line of weld in sequence first at a point adjacent to trimming means for removal of the flash therefrom and then adjacent to a shearing means for cutting out the corners of the abutting strips adjacent to the ends of the line of weld.

These objects as well as the various other novel features and advantages of this invention will be apparent from the following description and accompanying drawings of which:

FIG. 1 is a longitudinal sectional view through a portion of a continuous strip processing line in which there is diagrammatically illustrated one form of the invention herein disclosed;

FIG. 2 is an enlarged side view of the cutting devices employed for removing the flash formed at the line of weld where two strips of metal are joined together at their ends as indicated in the section taken through the weld;

FIG. 3 is a partial plan view of the strip at the line of weld from which the flash has been removed in which for clarity there is shown at one end of the line of weld one of the shearing devices in engagement with and in the process of cutting out the two adjacent strip corners and at the other end of the line of weld the appearance of the abutting strips after the adjacent corners have been removed, and FIG. 4 is made up of composite views identified by the reference characters from A to H illustrating in diagrammatic form the various steps taken and in the positions in which the joined strip ends will be placed subsequent to the welding of the strip ends together for the removal of the flash from the weld and for the cutting out of the adjacent corners of the strips at the line of weld.

With reference to FIG. 1 which embodies the preferred form of the invention herein disclosed, there is shown in sequence a strip looping device 11, secured for vertical pivotal movement to the frame of a flash welder 12 employing a gauge bar 12a and front and back centering guides 12b, a flash trimming device 13, a shear 14 for cutting out the adjacent corners of the strips at the line of weld, a longitudinally movable strip clamping assembly 15, a strip looping device 16, a roller conveyor 17, a pair of pinch rolls 18 and the entry end of a looping pit 19 into which strip is directed and gathered to be continuously withdrawn therefrom for further processing such as by pickling, for example.

Again referring to FIG. 1, the strip looping device 11 is actuated vertically, in order to form a loop in the strip for a purpose to be hereinafter defined, by means of a piston cylinder assembly 21 connected thereto and to the frame of the welder 12. Within the welder 12 there are provided two pairs of clamps 22 and 23. The clamps 22 are pressed into engagement with the leading end of a strip S and the clamps 23 engaged with the trailing end of the strip S' previously introduced into the line. Although not shown, the clamps 22 and the clamps 23 are so arranged and operated that with the separate strip ends gripped therebetween, the clamps are moved horizontally toward each other causing the strip ends to make contact and, after the strip ends have been heated sufficiently by the current passed therethrough by the welder, the clamps are again moved a controlled distance toward each other thereby upsetting the hot metal at the strip ends, thus forming a flash or burr as the weld is completed. To permit ease of adjustment of the clamp 22 with the leading end of the strips secured therebetween, as soon as the strip is clamped, the looping device 11 is actuated upward thereby causing a loop to form in the strip adjacent to the entry side of the welder. Not only is the tension in the strip thereby relieved but, of utmost importance, the loop provides sufficient flexibility for the strip to permit ready centering prior to clamping as well as a reserve from which strip is drawn following the welding operation as the welded strip is moved forward from the welder to succeeding positions in the line as will be explained hereinafter. Similarly, a loop is formed in the trailing end portion of the strip by upwardly actuating the looping roll 16. The second loop also provides sufficient flexibility to permit the end of the strip to be readily centered prior to its being clamped for purposes to be defined. Between the welder 12 and the flash trimmer 13, there is shown a conveyor roller 24 which carries the strip across the gap between the two units 12 and 13.

The flash trimmer 13 includes two pairs of strip clamps 25 and 26 which are so arranged as to grip the welded strip on either side of the weld, thereby exposing the flash or burr therebetween, and are so interconnected to the flash trimming knife holders 27 as to cause the knife holders to be positioned vertically adjacent one another in readiness for transverse movement across the weld.

The knife holders 27 are, in turn, connected to double acting piston cylinders 28 which, on being operated, cause the knives to traverse the strip and sever the flash therefrom. As shown in detail in FIG. 2, to the underside of the upper holder 27 and to the upper side of the lower holder 27, there is shown a series of pairs of opposed knives 29, 31, 32, 33 and 34. As FIG. 2 is viewed from left to right, it is to be observed the knives are positioned progressively closer together so that as the knives are passed across the weld to remove the flash, there will be a succession of cuts, the last pair 34 removing the final portion level with the surface of the strip. At times, it may be desirable to undercut the strips slightly at the line of weld and for this purpose the last pair of knives 34 may be spaced apart a distance slightly less than the thickness of the strip.

As shown in FIG. 1 and FIG. 3, the shear 14 consists of two pairs of dies comprising an upper die 35 and a lower die 36 which cooperate to cut out the strip corners at the ends of the welds on being actuated by suitable mechanism, not specifically shown, connected to the double acting piston cylinder assembly 37 mounted at the bottom portion of the shear frame.

The strip clamping assembly 15 consists of a pair of cooperating clamps 38 connected to a double acting piston cylinder assembly 39 affixed to a frame 41 mounted upon a carriage 42 provided with wheels 43 which traverse a pair of tracks 44 secured to a base 45. The carriage 42 is moved back and forth by a double acting piston cylinder assembly 46 connected thereto and mounted upon the base 45. On the front end of the carriage there is a member 47 which extends downward and is free to pass between the tracks on movement of the carriage. Beneath the carriage there is a stop 48 which is secured to and operated by a double acting piston cylinder assembly 49 also mounted on the base 45. For a purpose to be defined hereinafter, the distance between the stop 48 in its raised position and the member 47 when the carriage 42 is in the extreme left hand position is equal to the distance between the centerline of the knives of the flash trimming device 13 and the centerline of the cutting dies of the shear 14. Also on the carriage 42, there is a double acting piston cylinder assembly 49 connected to and adapted to raise and lower the looping device 16 pivotally secured to the right end of the carriage 42.

The operation of the combination of apparatus illustrated herein may be briefly summarized as follows, reference being made particularly to FIGS. 1 and 4:

As is shown in step A of FIG. 4, the trailing end of a strip previously introduced into the apparatus and the leading end of the next strip to be entered into the line are shown to be secured between the clamps 22 and 23 and flash welded in the welder 12 to form an endless strip. It is to be noted also that the movable clamps 38 of the assembly 15 are in gripping engagement with the strip. As soon as the flash weld is completed, the welding clamps 22 and 23 are released and immediately pressure is introduced into the piston cylinder assembly 46 to move the carriage 42, the clamps 38 and the strip secured therebetween in one step a distance equal to the full stroke of the assembly 46. Since the full stroke of the piston cylinder assembly 46 is equal to the distance between the centerline of the welder and the centerline of the staggered knives of the flash trimming apparatus 13, the weld thus will be positioned in one step at the centerline of the knives of the flash trimmer 13, completion of this movement being illustrated in FIG. 4, step B. When the weld is thus positioned within the flash trimmer 13, the clamps are engaged with the strip thereby to cause the knives to assume their proper spacing for trimming and, on transverse operation thereof, by actuating the piston cylinder assemblies 28 secured to the knife holders, the knives progressively cut away the flash, step C indicating that the last pair of knives 34 have reached the center of the weld. In the meantime, the clamps 38 of the strip clamping assembly 15 are opened, returned to the initial position thereof by reverse operation of the piston cylinder assembly 46 and reengaged with the strip as indicated in step D. Of course, during the time the clamps are opened and repositioned, removal of the flash at the weld continues and as shown in step D, the knives have passed beyond the center of the weld with the strip still held in position by the clamps 25 and 26 of the flash trimmer 14.

In step E, not only are the clamps 25 and 26 shown to be in their open positions, but the flash trimming knives and holders are also shown to have been moved back across the strip and into the initial position thereof as is shown in step A. So that a minimum amount of time will be required for positioning the weld, as soon as the clamps 38 are moved to the left to their initial positions, the stop 48 is raised by actuation of the piston cylinder assembly 49, so that when the piston cylinder assembly 46 is again actuated to the right to move the carriage 42 and the clamps 38 together with the strip clamped therebetween, the member 47 will strike the stop 48 thereby interrupting movement of the carriage so that in a single step the weld is positioned on the centerline of the dies of the shear 14. Again the clamps 25 and 26 of the flash trimmer are brought into engagement with the strip so as to cooperate with the clamps 38 already engaged with the strip thereby to hold the strip firmly during the time the dies are actuated to remove the corners of the strip as is shown in step F of FIG. 4. Thus, there will be no sharp or otherwise objectionable projections at the ends of the weld which may strike against portions of the apparatus such as the strip aligning devices, for example, which may cause the strip to "hang-up" in the line or result in the corners being bent back upon the body of the strip.

Following the step of cutting out the corners of the strips at the ends of the line of weld, the clamps 38 are immediately released, step G, and the pinch rolls 18 operated to draw the strip forward and into the looping pit 19 for storage. As in the case of the previous strip introduced into the line, movement of the trailing end of the joined strip will be interrupted in the welder 12 in readiness for joining to the leading end of another strip to be introduced. In the meantime the clamps 38 will be returned to their extreme left position, FIG. 1, and the stop 48 dropped to its inactive position, all in readiness for the next succeeding operations of welding, removal of flash from the weld and cutting out the corners of the strips at the line of weld.

In accordance with the provisions of the patent statutes I have explained the principle and operation of my invention and have illustrated and described what I consider to represent the best embodiment thereof. However, I desire to have it understood that within the scope of the appended claims, the invention may be practiced otherwise than as specifically illustrated and described.

I claim:

1. A method of removing the flash or burr formed at the weld by flash welding together the trailing end of one strip of metal to the leading end of another in a line for continuously processing endless strip in which there is included flash trimming means, the steps in sequence comprising positioning the leading end of one strip adjacent to and in abutting relationship with the trailing end of a strip previously introduced into said line, joining together the strip ends by flash welding, engaging the welded strip and in a single step orienting the weld within said flash trimming means in position for the removal of the flash therefrom, and trimming the flash from said weld.

2. A method of removing the flash or burr formed at the weld by flash welding together the trailing end of one strip of metal to the leading end of another in a line for continuously processing endless strip in which there are included flash trimming means and strip corner shearing means, the steps in sequence comprising positioning the leading end of one strip adjacent to and in abutting relationship with the trailing end of a strip previously introduced into said line, joining together the strip ends by flash welding, engaging the welded strip and in a single step orienting the weld within said flash trimming means in position for the removal of the flash therefrom, trimming the flash from said weld, in a single step orienting the weld within said shearing means, shearing the corners from the strip and then feeding forward for processing the joined, trimmed and sheared endless strip.

3. A method of removing the flash or burr formed at the weld by flash welding together the trailing end of one strip of metal to the leading end of another and for shearing the corners from the adjoined strips in a line for continuously processing endless strip in which there are included flash trimming means, strip corner shearing means and strip clamping and orienting means, the steps in sequence comprising positioning the leading end of one strip adjacent to and in abutting relationship with the trailing end of a strip previously introduced in said line, joining together the strip ends by flash welding and at the same time engaging the strip by said strip clamping means, operating said clamping means in a single step to orient the weld within said flash trimming means in position for the removal of the flash therefrom, trimming the flash from said weld, operating said strip clamping means for the second time and in a single step to orient the weld within said shearing means, shearing the corners from the strip and then feeding forward for processing the joined, trimmed and sheared endless strip.

4. In combination with a welder for flash welding together the trailing end of one strip to the leading end of a succeeding strip, apparatus comprising trimming means for removing the flash from the weld, and strip advancing means so related to said welder for engaging and advancing said strip in one operation to orient the weld within said trimming means.

5. Apparatus according to claim 4 in which there is included a shear for shearing the corners from the welded strip, said strip advancing means adapted to engage and advance said strip in one operation to orient the weld within said shearing means.

6. In combination with a welder for flash welding together the trailing end of one strip to the leading end of a succeeding strip, apparatus comprising trimming means for removing the flash from the weld, shearing means for removing the corners from said strips at the weld, strip advancing means so related to said welder for engaging and advancing said strip in one operation to orient the weld within said trimming means and so related to said shear for engaging and advancing said strip in another operation to orient the weld within said shear.

7. Apparatus according to claim 6 including stop means engageable with and for limiting the movement of said strip advancing means.

8. In combination with a welder for flash welding together the trailing end of one strip to the leading end of a succeeding strip, apparatus comprising trimming means for removing the flash from the weld and a strip corner shearing means for shearing the corners from the strip and arranged in sequence with respect to said trimming means, strip advancing means operatively arranged with respect to said trimming means and said shearing means for engaging and advancing said strip successively to orient said weld first within said trimming means and then within said corner shearing means.

9. Apparatus according to claim 8 including a single means connected to said strip advancing means for moving said last mentioned means successively to orient the weld first in said trimming means and then in said shearing means.

10. Apparatus according to claim 8 in which said strip advancing means comprises a movable carriage, a piston cylinder assembly connected to and for actuating said carriage, a pair of strip engaging elements carried by said carriage for engaging said strip, and a stop element for limiting the travel of said carriage.

11. Apparatus for joining metal strip in end-to-end relation, comprising welding means for securing respective strip ends together by forming a transversely extending welded joint therebetween, joint trimming means fixedly spaced from said welding means in a direction longitudinally of strip movement for removing weld surplus from the strip, strip gripping means mounted for movement in a direction longitudinally of strip movement, means for closing said strip gripping means on the strip to grip the latter prior to completion of the welding operation, and means operating after the welding operation for shifting said strip gripping means and the strip gripped thereby a precise amount equal to the distance between said welding means and said joint trimming means to accurately align the welded joint with said trimming means.

12. Apparatus for joining metal strip in end-to-end relation, comprising welding means for securing respective strip ends together by forming a transversely extending welded joint therebetween, first joint trimming means spaced from said welding means in a direction longitudinally of strip movement for removing certain weld surplus, second joint trimming means spaced a different distance from said welding means in a direction longitudinally of strip movement for removing certain other weld surplus projecting from the strip, strip gripping means mounted for movement in a direction longitudinally of strip movement, means for closing said strip gripping means on the strip to grip the latter prior to the completion of the welding operation, and means for shifting said strip gripping means and the strip gripped thereby first a precise amount equal to the distance between said welder and said first joint trimming means to accurately align the welded joint with the latter, and second, following operation of said first joint trimming means, a precise amount equal to the distance between said first and second joint trimming means to accurately align the welded joint with the latter.

13. The construction according to claim 12 wherein said strip gripping means includes a movable carriage, and fixed abutments are located in the path of carriage movement and abut with the carriage to precisely determine the positions of said strip gripping means.

14. The construction according to claim 12 wherein one of said joint trimming means removes weld surplus from opposite edges of the strip and the other of said joint trimming means removes weld surplus from opposite sides of the strip.

15. The construction according to claim 14 wherein said one joint trimming means notches opposite edges of the strip at the weld line.

References Cited by the Examiner
UNITED STATES PATENTS

| | | |
|---|---|---|
| 1,731,441 | 10/1929 | Schane. |
| 1,832,719 | 11/1931 | McBerty. |
| 1,936,314 | 11/1933 | Sykes. |
| 2,120,316 | 6/1938 | Stone. |
| 2,175,616 | 10/1939 | Reed. |
| 2,177,356 | 10/1939 | Stone et al. _____ 29—481 X |
| 2,533,605 | 12/1950 | Mueller _____ 29—33.2 X |
| 2,672,835 | 3/1954 | Paul _____ 113—113 X |
| 2,782,488 | 2/1957 | Anderson _____ 29—482 X |
| 3,003,052 | 10/1961 | Williams et al. _____ 219—101 |

ANTHONY BARTIS, *Acting Primary Examiner.*

RICHARD M. WOOD, JOHN F. CAMPBELL, WHITMORE A. WILTZ, *Examiners.*

C. I. SHERMAN, *Assistant Examiner.*